(12) United States Patent
Tamrakar et al.

(10) Patent No.: US 11,336,339 B2
(45) Date of Patent: May 17, 2022

(54) PRECODING MATRIX INDICATION METHOD, TERMINAL, AND NETWORK SIDE DEVICE

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Hui Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 235 days.

(21) Appl. No.: 16/608,154

(22) PCT Filed: Apr. 17, 2018

(86) PCT No.: PCT/CN2018/083345
§ 371 (c)(1),
(2) Date: Oct. 24, 2019

(87) PCT Pub. No.: WO2018/201889
PCT Pub. Date: Nov. 8, 2018

(65) Prior Publication Data
US 2020/0145064 A1    May 7, 2020

(30) Foreign Application Priority Data
May 4, 2017    (CN) .......................... 201710307917.X (51) Int. Cl.
*H04B 7/0456*    (2017.01)
*H04L 1/00*    (2006.01)
(Continued)

(52) U.S. Cl.
CPC ......... *H04B 7/0456* (2013.01); *H04L 1/0027* (2013.01); *H04W 72/042* (2013.01); *H04W 72/1289* (2013.01)

(58) Field of Classification Search
CPC .. H04B 7/0456; H04B 7/0417; H04B 7/0639; H04L 1/0027; H04L 5/0053;
(Continued)

(56) References Cited

U.S. PATENT DOCUMENTS

2008/0260059 A1    10/2008    Pan
2009/0046569 A1    2/2009    Chen et al.
(Continued)

FOREIGN PATENT DOCUMENTS

CN    102244559 A    11/2011
CN    102860070 A    1/2013
(Continued)

OTHER PUBLICATIONS

First Office Action and Search Report from CN app. No. 201710307917.X, dated Mar. 27, 2020, with English translation from Global Dossier.
(Continued)

*Primary Examiner* — Walter J Divito
(74) *Attorney, Agent, or Firm* — Ladas & Parry, LLP (57) ABSTRACT

Provided in the present disclosure are a precoding matrix indication method, a terminal, and a network device, the method includes: receiving, by a terminal, a control signaling transmitted from a network side device, wherein the control signaling includes N bits of precoding information, and the N is a positive integer; determining, by the terminal, a quantity of precoding granules according to a scheduling resource, and determining, by the terminal, bits of the precoding information of each of the precoding granules in the N bits of precoding information according to the quantity
(Continued)

of the precoding granules, wherein each of the precoding granules includes at least one subband, and each of the at least one subband includes at least one PRB; and acquiring, by the terminal, a precoding matrix indicated by the bits of the precoding information of each of the precoding granules.

20 Claims, 3 Drawing Sheets

(51) Int. Cl.
*H04W 72/04* (2009.01)
*H04W 72/12* (2009.01)

(58) Field of Classification Search
CPC ... H04L 5/0023; H04L 5/0057; H04L 1/0038; H04W 72/042; H04W 72/1289
See application file for complete search history.

(56) References Cited

U.S. PATENT DOCUMENTS

| | | |
|---|---|---|
| 2011/0255483 A1 | 10/2011 | Xu et al. |
| 2011/0255505 A1 | 10/2011 | Liu et al. |
| 2013/0064207 A1 | 3/2013 | Wang et al. |
| 2014/0185699 A1 | 7/2014 | Zhang et al. |
| 2015/0131546 A1* | 5/2015 | Seo .................. H04W 72/0453 370/329 |
| 2019/0207731 A1* | 7/2019 | Park ..................... H04B 7/0639 |
| 2020/0022120 A1* | 1/2020 | Liu .................. H04W 72/0446 |
| 2020/0127786 A1* | 4/2020 | Kwak ............... H04L 27/26025 |

FOREIGN PATENT DOCUMENTS

| | | |
|---|---|---|
| CN | 102948243 A | 2/2013 |
| WO | 2013033919 A1 | 3/2013 |
| WO | 2018132781 A1 | 7/2018 |

OTHER PUBLICATIONS

Extended European Search Report from EP app. No. 18794784.1, dated Feb. 21, 2020.
International Search Report from PCT/CN2018/083345, dated Jun. 29, 2018, with English translation from WIPO.
Written Opinion of the International Searching Authority from PCT/CN2018/083345, dated Jun. 29, 2018, with English translation from WIPO.
International Preliminary Report on Patentability from PCT/CN2018/083345, dated Nov. 5, 2019, with English translation provided by WIPO.
"PRG options of dynamic selection of PRG for NR DMRS", R1-1702912, 3GPP TSG RAN WG1 Meeting #88, Athens, Greece, Feb. 13-17, 2017.

* cited by examiner

PRECODING MATRIX INDICATION METHOD, TERMINAL, AND NETWORK SIDE DEVICE

CROSS-REFERENCE TO RELATED APPLICATIONS

The present application is the U.S. national phase of PCT Application No. PCT/CN2018/083345 filed on Apr. 17, 2018, which claims a priority to Chinese Patent Application No. 201710307917.X filed in China on May 4, 2017, the disclosures of which are incorporated herein by reference in their entireties.

TECHNICAL FIELD

The present disclosure relates to the field of communication technologies, and in particular, to a precoding matrix indication method, a terminal, and a network side device.

BACKGROUND

In a communication system (for example, an New Radio (NR) system), since a quantity of transmitting antennas of a terminal is large and computing power of the terminal is improved, it is considered to adopt subband precoding in uplink data transmission, that is, precoding is performed by the terminal on a frequency resource scheduled for the uplink data transmission according to a small subband, and different precoding matrices are used on different subbands, which is called subband precoding. However, since a size of a scheduled resource is variable, a quantity of the subbands is also variable, so that a quantity of bits of a control signaling notified by precoding of a network side device changes according to the quantity of the subbands. For example, the quantity of the transmitting antennas of the terminal is 2, and precoding matrix indication is 3 bits. In this regard, if a frequency resource with a size of one subband is scheduled by the network side device, the network side device needs to notify the terminal of the precoding matrix with 3 bits of control signaling, and if a frequency resource with a size of two subbands is scheduled by the network side device, the network side device needs to notify the terminal of the precoding matrix with 6 bits (3 bits per subband) of control signaling. However, since the control signaling transmitted by the network side device is received by the terminal through blind detection, change of length of the control signaling increases complexity of the blind detection of the terminal receiving the control signaling. It can be seen that the complexity of the blind detection of the terminal receiving the control signaling is high at present.

SUMMARY

An object of the present disclosure is to provide a precoding matrix indication method, a terminal, and a network side device, so as to solve a problem that complexity of blind detection of the terminal receiving a control signaling is high.

In order to achieve the above object, embodiments of the present disclosure provide a precoding matrix indication method, including: receiving, by a terminal, a control signaling transmitted from a network side device, wherein the control signaling includes N bits of precoding information, and the N is a positive integer; determining, by the terminal, a quantity of precoding granules according to a scheduling resource, and determining, by the terminal, bits of the precoding information of each of the precoding granules in the N bits of precoding information according to the quantity of the precoding granules, wherein each of the precoding granules includes at least one subband, and each of the at least one subband includes at least one Physical Resource Block (PRB); and acquiring, by the terminal, a precoding matrix indicated by the bits of the precoding information of each of the precoding granules.

In some optional embodiments, determining by the terminal the bits of the precoding information of each of the precoding granules in the N bits of precoding information according to the quantity of the precoding granules includes: determining, by the terminal, a quantity of the bits of the precoding information of each of the precoding granules according to the quantity of the precoding granules; and determining, by the terminal, the bits of the precoding information of each of the precoding granules in the N bits of precoding information according to the quantity of the bits of the precoding information of each of the precoding granules.

In some optional embodiments, acquiring by the terminal the precoding matrix of each of the precoding granules includes: selecting, by the terminal from a precoding matrix group corresponding to each of the precoding granules, the precoding matrix indicated by bits of the precoding information of the precoding granule.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-acquired signaling or is pre-agreed.

In some optional embodiments, determining by the terminal the quantity of the precoding granules according to the scheduling resource includes: determining, by the terminal, the quantity of the precoding granules according to size information of the scheduling resource in the control signaling; or determining, by the terminal, the quantity of the precoding granules according to a size of the precoding granule indicated by another signaling being pre-received and a size of the scheduling resource.

In some optional embodiments, a same precoding matrix is used by the subbands included in each of the precoding granules, and a quantity of the subbands included in each of the precoding granules is indicated by a signaling or is a preset value.

The embodiments of the present disclosure further provide a precoding matrix indication method, including: generating, by a network side device, a control signaling including N bits of precoding information, wherein the N bits of precoding information includes bits of the precoding information of each of pre-coding granules included in a scheduling resource of a terminal, and a precoding matrix of each of precoding granules is indicated by respective bits of the precoding information, and the N is a positive integer; and transmitting, by the network side device, the control signaling to the terminal.

In some optional embodiments, a quantity of the bits of the precoding information of each of the precoding granules is determined according to a quantity of the precoding granules of the scheduling resource.

In some optional embodiments, the precoding matrix of each of the precoding granules is indicated by the respective bits of the precoding information in a corresponding precoding matrix group.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-transmitted signaling or is pre-agreed.

In some optional embodiments, the quantity of the precoding granules includes: the quantity of the precoding granules corresponding to size information of the scheduling resource in the control signaling; or the quantity of the precoding granules determined by a size of the precoding granule indicated by another signaling being pre-transmitted from the network side device and a size of the scheduling resource.

In some optional embodiments, a same precoding matrix is used by subbands included in each of the precoding granules, and a quantity of the subbands included in each of the precoding granules is indicated by a signaling or is a preset value.

The embodiments of the present disclosure further provide a terminal, including: a receiving module, configured to receive a control signaling transmitted from a network side device, wherein the control signaling includes N bits of precoding information, and the N is a positive integer; a determining module, configured to determine a quantity of precoding granules according to a scheduling resource, and determine bits of the precoding information of each of the precoding granules in the N bits of precoding information according to the quantity of the precoding granules, wherein each of the precoding granules includes at least one subband, and each of the at least one subband includes at least one PRB; and an acquiring module, configured to acquire a precoding matrix indicated by the bits of the precoding information of each of the precoding granules.

In some optional embodiments, the determining module is configured to: determine the quantity of the precoding granules according to the scheduling resource; determine a quantity of the bits of the precoding information of each of the precoding granules according to the quantity of the precoding granules; and determine the bits of the precoding information of each of the precoding granules in the N bits of precoding information according to the quantity of the bits of the precoding information of each of the precoding granules.

In some optional embodiments, the acquiring module is configured to select, from a precoding matrix group corresponding to each of the precoding granules, the precoding matrix indicated by bits of the precoding information of the precoding granule.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-acquired signaling or is pre-agreed.

In some optional embodiments, the determining module is configured to: determine the quantity of the precoding granules according to size information of the scheduling resource in the control signaling, and determine the bits of the precoding information of each of the precoding granules in the N bits of precoding information according to the quantity of the precoding granules; or determine the quantity of the precoding granules according to a size of the precoding granule indicated by another signaling being pre-received and the size of the scheduling resource, and determine the bits of the precoding information of each of the precoding granules in the N bits of precoding information according to the quantity of the precoding granules.

In some optional embodiments, a same precoding matrix is used by the subbands included in each of the precoding granules, and a quantity of the subbands included in each of the precoding granules is indicated by a signaling or is a preset value.

The embodiment of the present disclosure further provides a network side device, including: a generating module, configured to generate a control signaling including N bits of precoding information, wherein the N bits of precoding information includes bits of the precoding information of each of pre-coding granules included in a scheduling resource of a terminal, and a precoding matrix of each of precoding granules is indicated by respective bits of the precoding information, and the N is a positive integer; and a transmitting module, configured to transmit the control signaling to the terminal.

In some optional embodiments, a quantity of the bits of the precoding information of each of the precoding granules is determined according to a quantity of the precoding granules of the scheduling resource.

In some optional embodiments, the precoding matrix of each of the precoding granules is indicated by the respective bits of the precoding information in a corresponding precoding matrix group.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-transmitted signaling or is pre-agreed.

In some optional embodiments, the quantity of the precoding granules includes: the quantity of the precoding granules corresponding to size information of the scheduling resource in the control signaling; or the quantity of the precoding granules determined by a size of the precoding granule indicated by another signaling being pre-transmitted from the network side device and the size of the scheduling resource.

In some optional embodiments, a same precoding matrix is used by subbands included in each of the precoding granules, and a quantity of the subbands included in each of the precoding granules is indicated by a signaling or is a preset value.

The embodiment of the present disclosure further provides a terminal, including: a processor, a transceiver, and a memory, wherein the processor is configured to read a program in the memory to: receive, through the transceiver, a control signaling transmitted from a network side device, wherein the control signaling includes N bits of precoding information, and the N is a positive integer; determine a quantity of precoding granules according to a scheduling resource, and determine bits of the precoding information of each of the precoding granules in the N bits of precoding information according to the quantity of the precoding granules, wherein each of the precoding granules includes at least one subband, and each of the at least one subband includes at least one PRB; and acquire a precoding matrix indicated by the bits of the precoding information of each of the precoding granules, the transceiver is configured to receive and transmit data.

The embodiment of the present disclosure further provides a network side device, including: a processor, a transceiver, and a memory, wherein the processor is configured to read a program in the memory to: generate a control signaling including N bits of precoding information, wherein the N bits of precoding information includes bits of the precoding information of each of pre-coding granules included in a scheduling resource of a terminal, and a precoding matrix of each of precoding granules is indicated by respective bits of the precoding information, and the N is a positive integer; and transmit, through the transceiver, the control signaling to the terminal, the transceiver is configured to receive and transmit data.

The above technical solutions of the present disclosure have at least the following beneficial effects: in the embodiments of the present disclosure, receiving, by a terminal, a control signaling transmitted from a network side device, wherein the control signaling includes N bits of precoding information, and the N is a positive integer; determining, by the terminal, a quantity of precoding granules according to a scheduling resource, and determining, by the terminal, bits of the precoding information of each of the precoding granules in the N bits of precoding information according to the quantity of the precoding granules, wherein each of the precoding granules includes at least one subband; and acquiring, by the terminal, a precoding matrix indicated by the bits of the precoding information of each of the precoding granules. In this way, the precoding matrix may be indicated by using fixed N bits of precoding information, so that the complexity of the blind detection of the terminal receiving the control signaling can be reduced.

DETAILED DESCRIPTION

In order to make technical problems, technical solutions and advantages to be solved by the embodiments of the present disclosure more clear, detailed description will be made below in conjunction with the accompanying drawings and specific embodiments.

Figure 1:
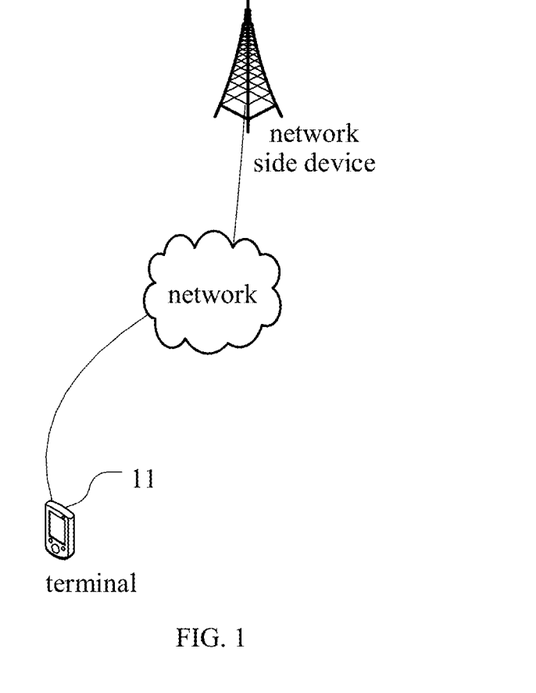
FIG. 1 is a schematic diagram of a network structural applicable to an embodiment of the present disclosure.

Referring to FIG. 1, FIG. 1 is a schematic diagram of a network structure applicable to an embodiment of the present disclosure. As shown in FIG. 1, a terminal 11 and a network side device 12 are included. The terminal 11 may be a terminal side device, such as a mobile phone, a tablet personal computer, and a laptop computer, a Personal Digital Assistant (PDA), a Mobile Internet Device (MID), or a wearable device, etc. It should be appreciated that a specific type of the terminal 11 is not limited in the embodiments of the present disclosure. The terminal 11 can establish communication with the network side device 12, wherein a network in the drawings can indicate that the terminal 11 establishes wireless communication with the network side device 12, and the network side device 12 can be an evolved Node B (eNB) or another base station, or it may be an access point device, or the like. It should be appreciated that a specific type of the network side device 12 is not limited in the embodiments of the present disclosure.

Figure 2:
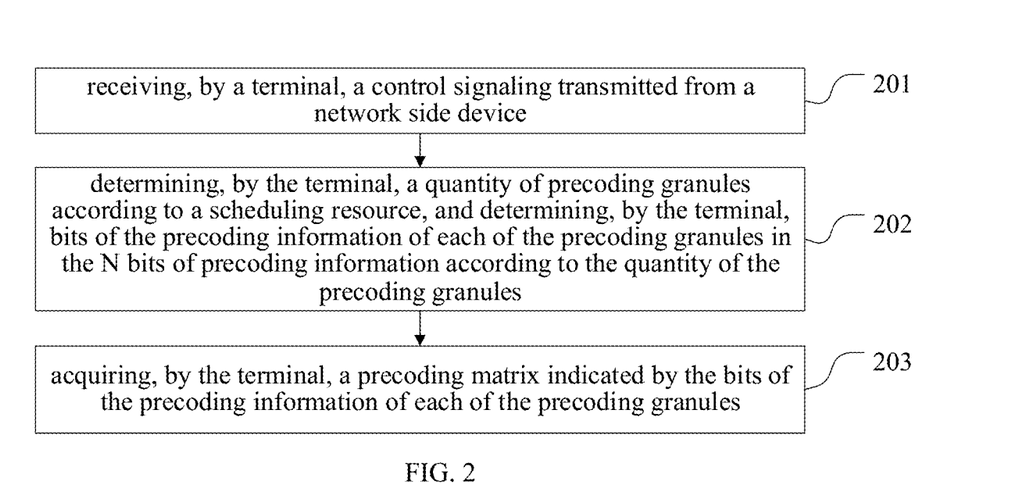
FIG. 2 is a flowchart of a precoding matrix indication method according to an embodiment of the present disclosure.

Referring to FIG. 2, a precoding matrix indication method is provided by an embodiment of the present disclosure. As shown in FIG. 2, the method includes the following steps: at step 201, receiving, by a terminal, a control signaling transmitted from a network side device, wherein the control signaling includes N bits of precoding information, and the N is a positive integer; at step 202, determining, by the terminal, a quantity of precoding granules according to a scheduling resource, and determining, by the terminal, bits of the precoding information of each of the precoding granules in the N bits of precoding information according to the quantity of the precoding granules, wherein each of the precoding granules includes at least one subband, and each of the at least one subband includes at least one PRB; at step 203, acquiring, by the terminal, a precoding matrix indicated by the bits of the precoding information of each of the precoding granules.

The above control signaling may be used for precoding matrix indication. It should be appreciated that, in addition to the N bits of precoding information, the above control signaling may further include other information, and a quantity of bits of the other information is also fixed, so that a total quantity of bits of the control signaling is fixed.

In addition, the N may be pre-configured by the network side device, or specified by a protocol, or pre-negotiated by the network side device and the terminal, etc., for example, N is 10 or 20 or 30, etc. In the embodiments of the present disclosure, due to that a quantity of the bits of the precoding information in the control signaling is N, that is, a length of the precoding information is fixed or invariable, complexity of blind detection of the terminal receiving the control signaling can be reduced. In addition, in the embodiments of the present disclosure, precoding information of same quantity of bits may be used for different terminals or different services.

The above scheduling resource may be scheduled by the network side device to the terminal or allocated by the network side device to the user terminal, and the resource may include one or more precoding granules, and each of the precoding granules may include one or more subbands, and each of the one or more subbands includes at least one PRB, and the subbands within the same precoding granule use a same precoding matrix. In the embodiments of the present disclosure, quantities of the subbands included in different precoding granules may be same or different, which is not limited in the embodiments of the present disclosure.

Determining the quantity of the precoding granules according to the scheduling resource may be determining the quantity of the precoding granules of the scheduling resource, that is, determining how many precoding granules are included in the scheduling resource, wherein it may be determined according to a pre-acquired correspondence, or may be determined according to size information of the scheduling resource, etc., which is not limited in the embodiments of the present disclosure.

Determining the bits of the precoding information of each of the precoding granules in the N bits of precoding information according to the quantity of the precoding granules may be, determining the quantity of the bits of the precoding information according to correspondence between the quantity of the precoding granules and the quantity of the bits of the precoding information, and determining the precoding information of each of precoding granules according to the quantity of the bits of the precoding information. For example, the bits of the precoding information of each of the precoding granules are determined in the above N bits of precoding information according to order of frequency domain or time domain of the precoding granules. If precoding granule 1 is in front of precoding granule 2 according to the order of the frequency domain or the time domain, the N is 10, and the quantity of the bits of the precoding information is 5, then it can be determined that first 5 bits are the bits of the precoding information of the precoding granule 1, and last 5 bits are the bits of the precoding information of the precoding granule 2. It should be appreciated that, in the embodiments of the present disclosure, it is not limit to determine the bits of the precoding information of each of the precoding granules by the above order, for example, the bits of the precoding information of each of the precoding granules may also be determined by correspondence between the precoding granules and positions of the bits of the precoding information.

The bits of the precoding information may be an index or indication information of the precoding matrix, so that after the bits of the precoding information of each of the precoding granules are acquired by the terminal, the precoding matrix of each of the precoding granules may be directly acquired. The precoding matrix of each of the precoding granules is a precoding matrix indicated by respective bits of the precoding information.

In the above steps, the bits of the precoding information of each of the precoding granules are determined according to the quantity of the precoding granules, so that it can be realized that the bits of the precoding information of the precoding granules are variable, and bits of total precoding information in the control signaling is invariable, so that the complexity of the blind detection of the terminal receiving the control signaling can be reduced. For example, if the scheduling resource scheduled by the network side device is large (for example, a quantity of the PRBs is large), then less bits are used to indicate the precoding matrix for each of the precoding granules, and if the scheduling resource scheduled by the network side device is small (for example, the quantity of the PRBs is small), then more bits are used to indicate the precoding matrix for each of the precoding granules, so as to keep a size of the control signaling of the total precoding indication unchanged.

In some optional embodiments, determining by the terminal the bits of the precoding information of each of the precoding granules in the N bits of precoding information according to the quantity of the precoding granules includes: determining, by the terminal, a quantity of the bits of the precoding information of each of the precoding granules according to the quantity of the precoding granules; and determining, by the terminal, the bits of the precoding information of each of the precoding granules in the N bits of precoding information according to the quantity of the bits of the precoding information of each of the precoding granules. The M is the quantity of the precoding granules included in the scheduling resource.

In this implementation, it can be realized that the quantity of the bits of the precoding information of the precoding granules may be changed according to the quantity of the precoding granules of the scheduling resource. For example, if the scheduling resource scheduled by the network side device is large (for example, the quantity of the PRBs is large), then less bits are used to indicate the precoding matrix for each of the precoding granules, and if the scheduling resource scheduled by the network side device is small (for example: the quantity of the PRBs is small), then more bits are used to indicate the precoding matrix for each of the precoding granules, so as to keep the size of the control signaling of the total precoding indication unchanged.

In addition, determining the quantity of the bits of the precoding information of each of the precoding granules according to the quantity of the precoding granules may be, determining the quantity of the bits of the precoding information of each of the precoding granule according to correspondence between a quantity of pre-acquired precoding granules and the quantity of the bits of the precoding information. Alternatively, a calculation may be made based on the N and the M; for example, an integer of N divided by M is used as the quantity of the bits of the precoding information of each of the precoding granules, wherein the M is the quantity of the precoding granules, that is, the quantity of the precoding granules of the scheduling resource. For example, the N is 20 and the M is 4, and then the precoding matrix of each of the precoding granules uses 5 bits to indicate the precoding matrix index. An example is shown in Table 1.

TABLE 1

| bits of precoding information | precoding matrix index |
| --- | --- |
| 00000 | precoding matrix 1 |
| 00001 | precoding matrix 2 |
| 00010 | precoding matrix 3 |
| 00011 | precoding matrix 4 |
| ... | ... |
| 11111 | precoding matrix 32 |

Thus each of the precoding granules can indicate one of the 32 precoding matrices by 5 bits.

For another example, if the N is 20 and the M is 5, the precoding matrix of each of the precoding granules indicates the precoding matrix index by 4 bits. An example is shown in Table 2.

TABLE 2

| bits of precoding information | precoding matrix index |
| --- | --- |
| 0000 | precoding matrix 1 |
| 0001 | precoding matrix 2 |
| 0010 | precoding matrix 3 |
| 0011 | precoding matrix 4 |
| ... | ... |
| 1111 | precoding matrix 16 |

Thus each of the precoding granules can indicate one of the 16 precoding matrices by 4 bits.

For another example, if the N is 20 and the M is 6, the precoding matrix of each of the precoding granules indicates the precoding matrix index by 3 bits. An example is shown in Table 3.

TABLE 3

| bits of precoding information | precoding matrix index |
| --- | --- |
| 000 | precoding matrix 1 |
| 001 | precoding matrix 2 |
| 010 | precoding matrix 3 |
| 011 | precoding matrix 4 |
| ... | ... |
| 111 | precoding matrix 16 |

In the embodiments of the present disclosure, a bit corresponding to a remainder of the N divided by the M may be filled with a preset value or used as spare bits. For example, in 3 bits of precoding information shown in Table 2, 20 is divided by 3 and a remainder is 2, that is, 20−(6*3)=2, then the 2 bits are filled with the preset value or used as the spare bits.

In some optional embodiments, acquiring by the terminal the precoding matrix of each of the precoding granules includes: selecting, by the terminal from a precoding matrix group corresponding to each of the precoding granules, the precoding matrix indicated by bits of the precoding information of the precoding granule.

In this implementation, it can be realized that each of the precoding granules corresponds to a precoding matrix group, and each of the precoding granules selects a precoding matrix indicated by the bits of the precoding information only in its own corresponding precoding matrix group, thereby increasing flexibility of the precoding matrix of the precoding granules.

In addition, in the embodiments of the present disclosure, the precoding matrix group corresponding to each of the precoding granules may be pre-stored, or may be configured by the network side device to the terminal, and the like, which is not limited in the embodiments of the present disclosure.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-acquired signaling or is pre-agreed.

In this implementation, in the case that the precoding matrix group corresponding to any one of the precoding granules is different from the precoding matrix group corresponding to any other one of the precoding granules, or the precoding matrix groups corresponding to the respective some of the precoding granules are the same, the precoding matrix group corresponding to each of the precoding granules is notified through a pre-acquired signaling or is pre-agreed. In a case that the precoding matrix group corresponding to any one of the precoding granules is same as the precoding matrix group corresponding to any other one of the precoding granules, that is, there is only one same precoding matrix group, no signaling may be needed for notification, and the precoding matrix group can be default or pre-agreed. In addition, the above signaling may be the control signaling received in step 201, or may be another signaling, which is not limited in this embodiment of the disclosure.

In some optional embodiments, determining by the terminal the quantity of the precoding granules according to the scheduling resource includes: determining, by the terminal, the quantity of the precoding granules according to size information of the scheduling resource in the control signaling; or determining, by the terminal, the quantity of the precoding granules according to a size of the precoding granule indicated by another signaling being pre-received and a size of the scheduling resource.

In this implementation, it can be realized that the quantity of corresponding precoding granules is determined according to the size information of the scheduling resource in the control signaling. For example, the quantity of the precoding granules may be determined according to correspondence between size information of the pre-acquired scheduling resource and the quantity of the precoding granules. Thus, since the quantity of the precoding granules is determined by the size information of the scheduling resource in the control signaling, flexibility of the system is improved. The size information of the scheduling resource may also be referred to as size information of the scheduling resource.

In addition, in this implementation, it can also be realized that the quantity of the precoding granules is determined according to the size of the precoding granule and the size of the scheduling resource. For example, a calculation is performed based on the size of the scheduling resource and the size of the precoding granule to obtain the quantity of the precoding granules, such as an integer obtained by dividing the size of the scheduling resource by the size of the precoding granule may be determined as the quantity of precoding granules; or it can also be realized that the quantity of the precoding granules is determined according to correspondence among a size of the pre-acquired precoding granule, the size of the scheduling resource, and the quantity of the precoding granules, so as to flexibly indicate the quantity of the precoding granules to the terminal.

In some optional embodiments, a same precoding matrix is used by the subbands included in each of the precoding granules, and a quantity of the subbands included in each of the precoding granules is indicated by a signaling or is a preset value.

The above signaling may be the control signaling received in step 201, or other signaling, which is not limited in the embodiments of the present disclosure. The flexibility of the system can be improved by indicating the quantity of the subbands included in each of the precoding granules through the signaling, and the transmission overhead can be reduced by using the preset value. The quantity of the subbands included in each of the precoding granules may be same or different. In addition, a specific subband included in each of the precoding granules are indicated by a signaling indication or pre-agreed.

It should be appreciated that various optional implementations introduced by the embodiments of the present disclosure may be implemented in combination with each other, or may be implemented separately, which is not limited in the embodiments of the present disclosure.

In the embodiments of the present disclosure, receiving by a terminal a control signaling transmitted from a network side device, wherein the control signaling includes N bits of precoding information, and the N is a positive integer; determining by the terminal a quantity of precoding granules according to a scheduling resource, and determining by the terminal bits of the precoding information of each of the precoding granules in the N bits of precoding information according to the quantity of the precoding granules, wherein each of the precoding granules includes at least one subband; and acquiring by the terminal a precoding matrix indicated by the bits of the precoding information of each of the precoding granules. In this way, the precoding matrix can be indicated by using fixed N bits of precoding information, so that the complexity of the blind detection of the terminal receiving the control signaling can be reduced.

Figure 3:
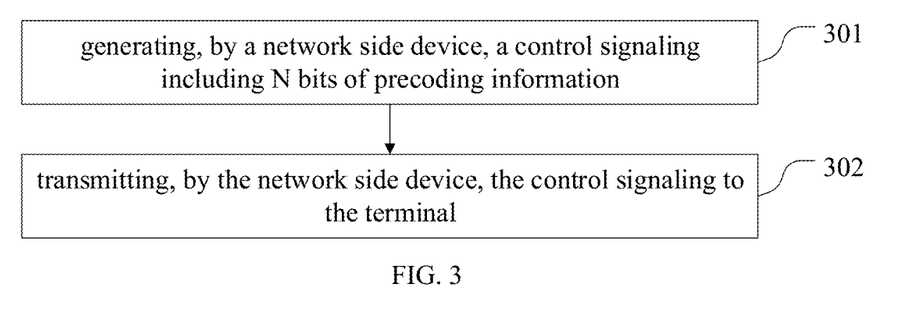
FIG. 3 is a flowchart of another precoding matrix indication method according to an embodiment of the present disclosure.

Referring to FIG. 3, an embodiment of the present disclosure provides another precoding matrix indication method. As shown in FIG. 3, the method includes following steps: at step 301, generating, by a network side device, a control signaling including N bits of precoding information, wherein the N bits of precoding information includes bits of the precoding information of each of pre-coding granules included in a scheduling resource of a terminal, and a precoding matrix of each of precoding granules is indicated by respective bits of the precoding information, and the N is a positive integer; at step 301, transmitting, by the network side device, the control signaling to the terminal.

In some optional embodiments, a quantity of the bits of the precoding information of each of the precoding granules is determined according to a quantity of the precoding granules of the scheduling resource.

In some optional embodiments, the precoding matrix of each of the precoding granules is indicated by the respective bits of the precoding information in a corresponding precoding matrix group.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-transmitted signaling or is pre-agreed.

In some optional embodiments, the quantity of the precoding granules includes: the quantity of the precoding granules corresponding to size information of the scheduling resource in the control signaling; or the quantity of the precoding granules determined by a size of the precoding granule indicated by another signaling being pre-transmitted from the network side device and a size of the scheduling resource.

In some optional embodiments, a same precoding matrix is used by subbands included in each of the precoding granules, and a quantity of the subbands included in each of the precoding granules is indicated by a signaling or is a preset value.

It should be appreciated that, this embodiment is an implementation of the network side device corresponding to the embodiment shown in FIG. 2, and a specific implementation of this embodiment may refer to explanation of the embodiment shown in FIG. 2. In order to avoid repeated explanation, it will not be repeated in this embodiment, and same beneficial effect can be achieved.

Figure 4:
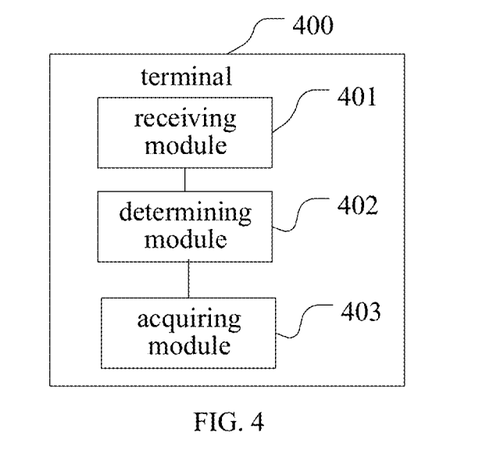
FIG. 4 is a structural diagram of a terminal according to an embodiment of the present disclosure.

Referring to FIG. 4, an embodiment of the present disclosure provides a structure diagram of a terminal. As shown in FIG. 4, the terminal 400 includes: a receiving module 401, configured to receive a control signaling transmitted from a network side device, wherein the control signaling includes N bits of precoding information, and the N is a positive integer; a determining module 402, configured to determine a quantity of precoding granules according to a scheduling resource, and determine bits of the precoding information of each of the precoding granules in the N bits of precoding information according to the quantity of the precoding granules, wherein each of the precoding granules includes at least one subband, and each of the at least one subband includes at least one PRB; and an acquiring module 403, configured to acquire a precoding matrix indicated by the bits of the precoding information of each of the precoding granules.

In some optional embodiments, the determining module 402 is configured to: determine the quantity of the precoding granules according to the scheduling resource; determine a quantity of the bits of the precoding information of each of the precoding granules according to the quantity of the precoding granules; and determine the bits of the precoding information of each of the precoding granules in the N bits of precoding information according to the quantity of the bits of the precoding information of each of the precoding granules.

In some optional embodiments, the acquiring module 403 is configured to select from a precoding matrix group corresponding to each of the precoding granules the precoding matrix indicated by bits of the precoding information of the precoding granule.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-acquired signaling or is pre-agreed.

In some optional embodiments, the determining module is configured to: determine the quantity of the precoding granules according to size information of the scheduling resource in the control signaling, and determine the bits of the precoding information of each of the precoding granules in the N bits of precoding information according to the quantity of the precoding granules; or determine the quantity of the precoding granules according to a size of the precoding granule indicated by another signaling being pre-received and the size of the scheduling resource, and determine the bits of the precoding information of each of the precoding granules in the N bits of precoding information according to the quantity of the precoding granules.

In some optional embodiments, a same precoding matrix is used by the subbands included in each of the precoding granules, and a quantity of the subbands included in each of the precoding granules is indicated by a signaling or is a preset value.

It should be appreciated that, in the embodiments, the terminal 40 may be a terminal in any implementation in the method embodiments of the disclosure, and any implementation of the terminal in the method embodiments of the disclosure can be implemented by the terminal 400 in the embodiments and achieve same beneficial effect, which will not be repeated herein.

Figure 5:
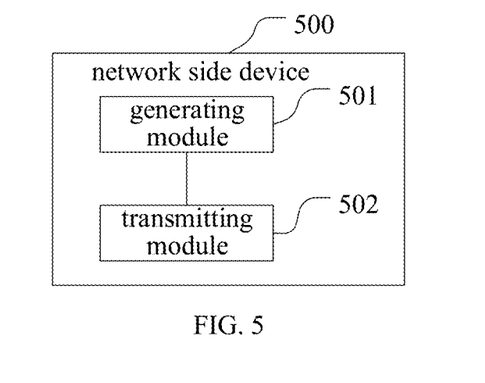
FIG. 5 is a structural diagram of a network side device according to an embodiment of the present disclosure.

Referring to FIG. 5, a structural diagram of a network side device is provided according to an embodiment of the present disclosure, as shown in FIG. 5, the network side device 500 includes: a generating module 501, configured to generate a control signaling including N bits of precoding information, wherein the N bits of precoding information includes bits of the precoding information of each of precoding granules included in a scheduling resource of a terminal, and a precoding matrix of each of precoding granules is indicated by respective bits of the precoding information, and the N is a positive integer; and a transmitting module 502, configured to transmit the control signaling to the terminal.

In some optional embodiments, a quantity of the bits of the precoding information of each of the precoding granules is determined according to a quantity of the precoding granules of the scheduling resource.

In some optional embodiments, the precoding matrix of each of the precoding granules is indicated by the respective bits of the precoding information in a corresponding precoding matrix group.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-transmitted signaling or is pre-agreed.

In some optional embodiments, the quantity of precoding granules includes: the quantity of the precoding granules corresponding to size information of the scheduling resource in the control signaling; or the quantity of the precoding granules determined by a size of the precoding granule indicated by another signaling being pre-transmitted from the network side device and the size of the scheduling resource.

In some optional embodiments, a same precoding matrix is used by subbands included in each of the precoding granules, and a quantity of the subbands included in each of the precoding granules is indicated by a signaling or is a preset value.

It should be appreciated that, in the embodiments, the network side device 500 may be a network side device in any implementation in the method embodiments of the disclosure, and any implementation of the network side device in the method embodiments of the disclosure can be implemented by the network side device 500 in the embodiments and achieve the same beneficial effect, which will not be repeated herein.

Figure 6:
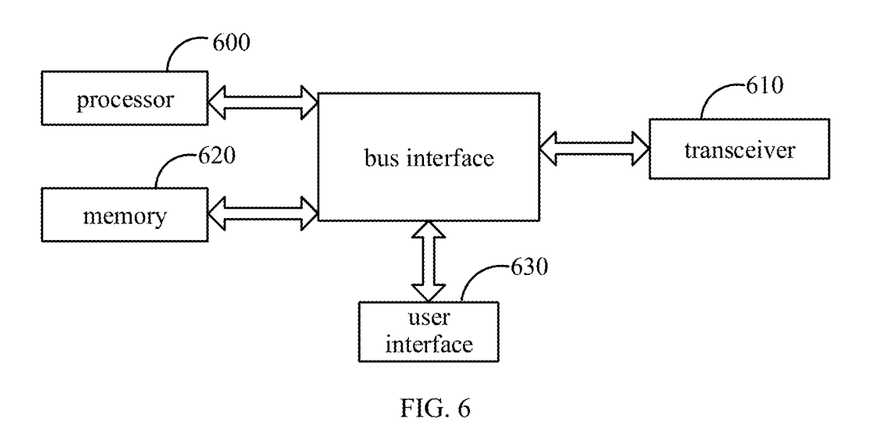
FIG. 6 is a structural diagram of another terminal according to an embodiment of the present disclosure.

Referring to FIG. 6, an embodiment of the present disclosure provides a structure diagram of another terminal. As shown in FIG. 6, the terminal includes: a processor 600, a transceiver 610, a memory 620, a user interface 630, and a bus interface, wherein the processor 600 is configured to read a program in the memory 620 to: receive, through the transceiver, a control signaling transmitted from a network side device, wherein the control signaling includes N bits of precoding information, and the N is a positive integer; determine a quantity of precoding granules according to a scheduling resource, and determine bits of the precoding information of each of the precoding granules in the N bits of precoding information according to the quantity of the precoding granules, wherein each of the precoding granules includes at least one subband, and each of the at least one subband includes at least one PRB; and acquire a precoding matrix indicated by the bits of the precoding information of each of the precoding granules. The transceiver 610 is configured to receive and transmit data under the control of the processor 600.

In FIG. 6, a bus architecture may include a number of buses and bridges connected to each other, so as to connect various circuits for one or more processors such as the processor 600 and one or more memories such as the processor 620. In addition, the bus architecture may be used to connect various other circuits, such as a circuit for a peripheral device, a circuit for a voltage stabilizer and a power management circuit, which are known in the art and will not be further described herein. The bus interface may be provided, and the transceiver 610 may consist of a plurality of elements, i.e., a transmitter and a receiver for communication with various other devices over a transmission medium. With respect to different User Equipments (UEs), the user interface 630 may also be provided for devices which are to be arranged inside or outside the UE, and these devices may include but not limited to a keypad, a display, a speaker, a microphone and a joystick.

The processor 600 may take charge of managing the bus architecture as well general processings. The processor 620 may store data therein for the operation of the processor 600.

In some optional embodiments, determining the bits of the precoding information of each of the precoding granules in the N bits of precoding information according to the quantity of the precoding granules includes: determining a quantity of the bits of the precoding information of each of the precoding granules according to the quantity of the precoding granules; and determining the bits of the precoding information of each of the precoding granules in the N bits of precoding information according to the quantity of the bits of the precoding information of each of the precoding granules. The M is the quantity of the precoding granules included in the scheduling resource In some optional embodiments, acquiring the precoding matrix of each of the precoding granules includes: selecting, from a precoding matrix group corresponding to each of the precoding granules, the precoding matrix indicated by bits of the precoding information of the precoding granule.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-acquired signaling or is pre-agreed.

In some optional embodiments, determining the quantity of the precoding granules according to the scheduling resource includes: determining the quantity of the precoding granules according to size information of the scheduling resource in the control signaling; or determining the quantity of the precoding granules according to a size of the precoding granule indicated by another signaling being pre-received and a size of the scheduling resource.

In some optional embodiments, a same precoding matrix is used by subbands included in each of the precoding granules, and a quantity of the subbands included in each of the precoding granules is indicated by a signaling or is a preset value.

It should be appreciated that, in the embodiments, the terminal may be the terminal in the embodiments shown in FIG. 1 to FIG. 3, and any implementation of the terminal in the embodiments shown in FIG. 1 to FIG. 3 can be implemented by the terminal in the embodiments and achieve same beneficial effect, which will not be repeated herein.

Figure 7:
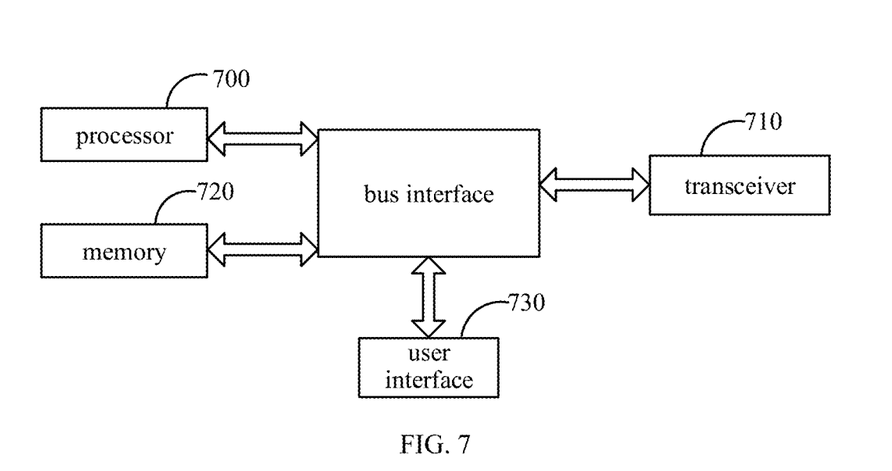
FIG. 7 is a structural diagram of another network side device according to an embodiment of the present disclosure.

Referring to FIG. 7, an embodiment of the present disclosure provides a structural diagram of another network side device. As shown in FIG. 7, the network side device includes: a processor 700, a transceiver 710, a memory 720, a user interface 730, and a bus interface, wherein the processor 700 is configured to read a program in the memory 720 to: generate a control signaling including N bits of precoding information, wherein the N bits of precoding information includes bits of the precoding information of each of pre-coding granules included in a scheduling resource of a terminal, and a precoding matrix of each of precoding granules is indicated by respective bits of the precoding information, and the N is a positive integer; and transmit, through the transceiver 710, the control signaling to the terminal.

In FIG. 7, a bus architecture may include a number of buses and bridges connected to each other, so as to connect various circuits for one or more processors such as the processor 700 and one or more memories such as the processor 720. In addition, the bus architecture may be used to connect various other circuits, such as a circuit for a peripheral device, a circuit for a voltage stabilizer and a power management circuit, which are known in the art and will not be further described herein. The bus interface may be provided, and the transceiver 710 may consist of a plurality of elements, i.e., a transmitter and a receiver for communication with various other devices over a transmission medium. With respect to different UEs, the user interface 730 may also be provided for devices which are to be arranged inside or outside the UE, and these devices may include but not limited to a keypad, a display, a speaker, a microphone and a joystick.

The processor 700 may take charge of managing the bus architecture as well general processings. The processor 720 may store data therein for the operation of the processor 700.

In some optional embodiments, a quantity of the bits of the precoding information of each of the precoding granules is determined according to a quantity of the precoding granules of the scheduling resource.

In some optional embodiments, the precoding matrix of each of the precoding granules is indicated by the respective bits of the precoding information in a corresponding precoding matrix group.

In some optional embodiments, the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same; and in a case that the precoding matrix group corresponding to any one of the precoding granules is different from the precoding matrix group corresponding to any other one of the precoding granules, or the precoding matrix groups corresponding to the respective some of the precoding granules are same, the precoding matrix group corresponding to each of the precoding granules is notified through a pre-transmitted signaling or is pre-agreed.

In some optional embodiments, the quantity of the precoding granules includes: the quantity of the precoding granules corresponding to size information of the scheduling resource in the control signaling; or the quantity of the precoding granules determined by a size of the precoding granule indicated by another signaling being pre-transmitted from the network side device and a size of the scheduling resource.

In some optional embodiments, a same precoding matrix is used by subbands included in each of the precoding granules, and a quantity of the subbands included in each of the precoding granules is indicated by a signaling or is a preset value.

It should be appreciated that, in the embodiments, the network side device may be the network side device in the embodiments shown in FIG. 1 to FIG. 3, and any implementation of the network side device in the embodiments shown in FIG. 1 to FIG. 3 can be implemented by the above network side device in the embodiments and achieve the same beneficial effect, which will not be repeated herein.

It should be further appreciated that, in the embodiments of the present disclosure, the devices and methods may be implemented in any other ways. For example, the embodiments for the device are merely for illustrative purposes, and the units are provided merely on the basis of their logic functions, and they may be provided in other ways during the actual application. For example, some modules or units may be combined together or integrated into another system. Alternatively, some features may be omitted or not executed. In addition, the shown or discussed coupling connection, direct coupling connection or communication connection may be implemented via interfaces, and the indirect coupling connection or communication connection between the devices or units may be implemented in an electrical or mechanical form or in another form.

In addition, the functional units in the embodiments of the present disclosure may be integrated into a processing unit, or the functional units may exist independently, or two or more functional units may be combined together. The integrated units may be implemented in a hardware form, or a hardware plus software of functional unit form.

In the case that the functional units are implemented in a software form, they may be stored in a computer-readable medium. The functional units may be stored in a storage medium and include several instructions so as to enable computer equipment (e.g., a personal computer, a server, or network equipment) to execute parts of the steps of the transmission and reception methods according to the embodiments of the present disclosure. The storage medium includes various medium capable of storing therein program codes, e.g., a Universal Serial Bus (USB) flash disk, a mobile Hard Disk (HD), a Read-Only Memory (ROM), a Random Access Memory (RAM), a magnetic disk or an optical disk.

The above are merely preferred embodiments of the present disclosure, and it should be appreciated that a person skilled in the art can make various improvements and modifications without departing from principles of the present disclosure, and these improvements and modifications should also be considered as falling into the protection scope of the present disclosure.

What is claimed is:

1. A precoding matrix indication method, comprising:
receiving, by a terminal, a control signaling transmitted from a network side device, wherein the control signaling comprises N bits of precoding information, and the N is a positive integer;
determining, by the terminal, a quantity of precoding granules according to a scheduling resource, and determining, by the terminal, bits of the precoding information of each of the precoding granules in the N bits of precoding information according to the quantity of the precoding granules, wherein each of the precoding granules comprises at least one subband, and each of the at least one subband comprises at least one Physical Resource Block (PRB); and
acquiring, by the terminal, a precoding matrix indicated by the bits of the precoding information of each of the precoding granules.

2. The method according to claim 1, wherein determining by the terminal the bits of the precoding information of each of the precoding granules in the N bits of precoding information according to the quantity of the precoding granules comprises:
determining, by the terminal, a quantity of the bits of the precoding information of each of the precoding granules according to the quantity of the precoding granules; and
determining, by the terminal, the bits of the precoding information of each of the precoding granules in the N bits of precoding information according to the quantity of the bits of the precoding information of each of the precoding granules.

3. The method according to claim 1, wherein acquiring by the terminal the precoding matrix of each of the precoding granules comprises:
selecting, by the terminal from a precoding matrix group corresponding to each of the precoding granules, the precoding matrix indicated by bits of the precoding information of the precoding granule.

4. The method according to claim 3, wherein
the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same.

5. The method according to claim 4, wherein the precoding matrix group corresponding to each of the precoding granules is notified through a pre-acquired signaling or is pre-agreed.

6. The method according to claim 1, wherein determining by the terminal the quantity of the precoding granules according to the scheduling resource comprises:
determining, by the terminal, the quantity of the precoding granules according to size information of the scheduling resource in the control signaling; or
determining, by the terminal, the quantity of the precoding granules according to a size of the precoding granule indicated by another signaling being pre-received and a size of the scheduling resource.

7. The method according to claim 1, wherein a same precoding matrix is used by the subbands comprised in each of the precoding granules, and a quantity of the subbands comprised in each of the precoding granules is indicated by a signaling or is a preset value.

8. A precoding matrix indication method, comprising:
generating, by a network side device, a control signaling comprising N bits of precoding information, wherein the N bits of precoding information comprises bits of the precoding information of each of pre-coding granules comprised in a scheduling resource of a terminal, and a precoding matrix of each of precoding granules is indicated by respective bits of the precoding information, and the N is a positive integer; and
transmitting, by the network side device, the control signaling to the terminal.

9. The method according to claim 8, wherein a quantity of the bits of the precoding information of each of the precoding granules is determined according to a quantity of the precoding granules of the scheduling resource.

10. The method according to claim 9, wherein the quantity of the precoding granules comprises:

the quantity of the precoding granules corresponding to size information of the scheduling resource in the control signaling; or the quantity of the precoding granules determined by a size of the precoding granules indicated by another signaling being pre-transmitted from the network side device and a size of the scheduling resource.

11. The method according to claim 8, wherein the precoding matrix of each of the precoding granules is indicated by the respective bits of the precoding information in a corresponding precoding matrix group.

12. The method according to claim 11, wherein the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same.

13. The method according to claim 12, wherein the precoding matrix group corresponding to each of the precoding granules is notified through a pre-transmitted signaling or is pre-agreed.

14. The method according to claim 8, wherein a same precoding matrix is used by subbands comprised in each of the precoding granules, and a quantity of the subbands comprised in each of the precoding granules is indicated by a signaling or is a preset value.

15. A terminal, comprising: a processor, a transceiver, and a memory, wherein the processor is configured to read a program in the memory to:

receive, through the transceiver, a control signaling transmitted from a network side device, wherein the control signaling comprises N bits of precoding information, and the N is a positive integer;

determine a quantity of precoding granules according to a scheduling resource, and determine bits of the precoding information of each of the precoding granules in the N bits of precoding information according to the quantity of the precoding granules, wherein each of the precoding granules comprises at least one subband, and each of the at least one subband comprises at least one PRB; and acquire a precoding matrix indicated by the bits of the precoding information of each of the precoding granules, the transceiver is configured to receive and transmit data.

16. The terminal according to claim 15, wherein the processor is further configured to read the program in the memory to:

determine a quantity of the bits of the precoding information of each of the precoding granules according to the quantity of the precoding granules; and determine the bits of the precoding information of each of the precoding granules in the N bits of precoding information according to the quantity of the bits of the precoding information of each of the precoding granules.

17. The terminal according to claim 15, wherein the processor is further configured to read the program in the memory to:

selecting, from a precoding matrix group corresponding to each of the precoding granules, the precoding matrix indicated by bits of the precoding information of the precoding granule.

18. The terminal according to claim 17, wherein the precoding matrix group corresponding to any one of the precoding granules is same as the precoding matrix group corresponding to any other one of the precoding granules, or the precoding matrix group corresponding to any one of the precoding granules is different from the precoding matrix group corresponding to any other one of the precoding granules, or the precoding matrix groups corresponding to respective some of the precoding granules are same.

19. The terminal according to claim 18, wherein the precoding matrix group corresponding to each of the precoding granules is notified through a pre-acquired signaling or is pre-agreed.

20. A network side device, comprising: a processor, a transceiver, and a memory, wherein the processor is configured to read a program in the memory to implement the steps of the method according to claim 8;

the transceiver is configured to receive and transmit data.

* * * * *